United States Patent
Simpson et al.

(10) Patent No.: US 7,858,187 B2
(45) Date of Patent: Dec. 28, 2010

(54) BONDING OF CARBON-CARBON COMPOSITES USING TITANIUM CARBIDE

(75) Inventors: Allen H. Simpson, Buchanan, MI (US); Slawomir T. Fryska, Granger, IN (US); Mark L. La Forest, Granger, IN (US); Alexander Mukasyan, Granger, IN (US)

(73) Assignees: Honeywell International Inc., Morristown, NJ (US); The University of Notre Dame Du Lac, Notre Dame, IN (US)

( * ) Notice: Subject to any disclaimer, the term of this patent is extended or adjusted under 35 U.S.C. 154(b) by 1291 days.

(21) Appl. No.: 11/391,255

(22) Filed: Mar. 29, 2006

(65) Prior Publication Data

US 2007/0235126 A1  Oct. 11, 2007

(51) Int. Cl.
*B32B 9/00* (2006.01)
(52) U.S. Cl. .................. 428/408; 423/447.1; 156/89.13
(58) Field of Classification Search .................. 428/408; 228/119; 156/285
See application file for complete search history.

(56) References Cited

U.S. PATENT DOCUMENTS

| | | | |
|---|---|---|---|
| 2,979,813 A | 4/1961 | Steinberg | |
| 3,895,084 A | 7/1975 | Bauer | |
| 4,514,240 A | 4/1985 | Heraud | |
| 4,721,840 A | 1/1988 | Fielding | |
| 4,742,948 A * | 5/1988 | Fisher et al. | 228/119 |
| 5,021,107 A | 6/1991 | Holko | |
| 5,139,594 A | 8/1992 | Rabin | |
| 5,340,014 A | 8/1994 | Sekhar et al. | |
| 5,382,769 A | 1/1995 | Jensen | |
| 5,471,028 A | 11/1995 | Kawai | |

(Continued)

FOREIGN PATENT DOCUMENTS

GB     504078     4/1938

(Continued)

OTHER PUBLICATIONS

J.D.E White, et al.; "Novel Apparatus for Joining of Carbon-Carbon Composites"; Review of Scientific Instruments; vol. 78; pp. 015105-1 thru 015105-5 (2007).

*Primary Examiner*—David R Sample
*Assistant Examiner*—Daniel Miller
(74) *Attorney, Agent, or Firm*—Shumaker & Sieffert, P.A.

(57) ABSTRACT

Method of joining carbon-carbon composite pieces together, e.g. in the refurbishment of aircraft brake discs. The method includes the steps of: providing a first carbon-carbon composite piece and a second carbon-carbon composite piece, wherein the second carbon-carbon composite piece has a surface that is complementary to a surface of said first carbon-carbon composite piece; providing a layer of a mixture of titanium powder and carbon powder on the first complementary mating surface; arranging the second carbon-carbon composite piece on the powder layer such that the second complementary mating surface is matched to the first complementary mating surface, thereby forming a construct of the first carbon-carbon composite piece, the powder layer, and the second carbon-carbon composite piece; placing the construct into a press and applying pressure to the construct to press together the two pieces joined at their complementary surfaces; and applying an electrical current to the powder in the construct to initiate an oxidation-reduction reaction, thereby bonding the carbon-carbon composite pieces together.

11 Claims, 1 Drawing Sheet

U.S. PATENT DOCUMENTS

| | | |
|---|---|---|
| 5,483,035 A | 1/1996 | Kawai et al. |
| 5,587,091 A | 12/1996 | Kawagoe et al. |
| 5,632,434 A | 5/1997 | Evans et al. |
| 5,972,157 A * | 10/1999 | Xue et al. ............. 156/285 |
| 6,174,605 B1 | 1/2001 | Xue et al. |
| 6,699,427 B2 | 3/2004 | Huang et al. |
| 6,878,331 B2 | 4/2005 | Huang et al. |
| 2003/0178468 A1 | 9/2003 | Lee et al. |
| 2004/0066610 A1 | 4/2004 | Miyachi et al. |
| 2005/0183909 A1 | 8/2005 | Rau, III et al. |

FOREIGN PATENT DOCUMENTS

| | | |
|---|---|---|
| JP | 59146918 | 8/1984 |
| JP | 4042124 | 2/1992 |

* cited by examiner

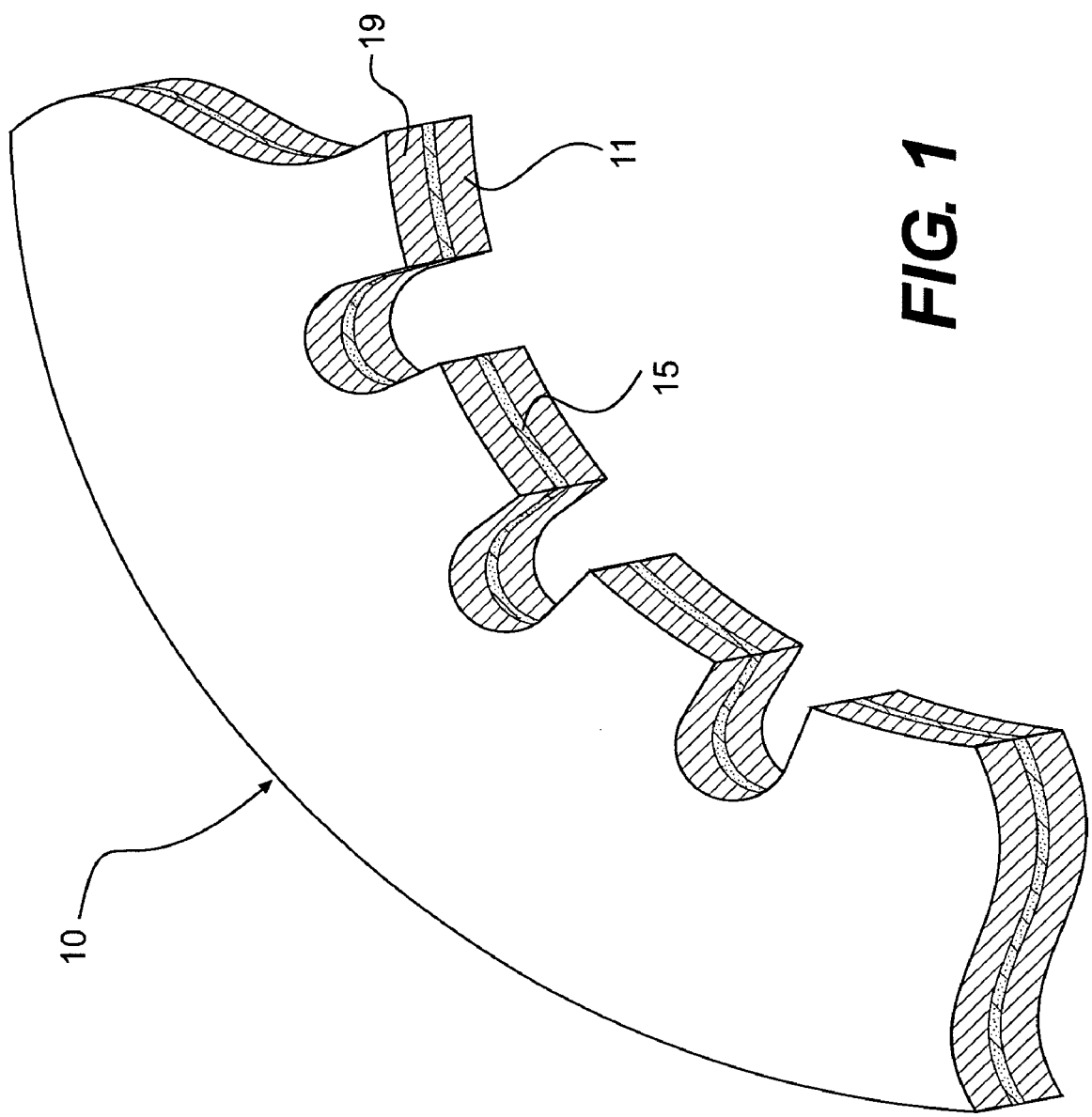

BONDING OF CARBON-CARBON COMPOSITES USING TITANIUM CARBIDE

This invention relates to carbon-carbon composite materials, and in particular to bonding carbon-carbon composites parts together with titanium carbide. The method of the present invention is especially suitable for the refurbishment of worn carbon-carbon composite brake discs in aircraft landing systems. Brake discs refurbished in accordance with the method of this invention are likewise contemplated herein.

BACKGROUND OF THE INVENTION

Currently, carbon-carbon composite parts are often attached to one another by mechanical means, such as rivets, or by glues. These methods are not satisfactory for carbon-carbon composite parts that are used as friction materials in aircraft brakes, due to the high loads and very high temperatures that are encountered in that environment.

U.S. Pat. No. 5,972,157, assigned on its face to AlliedSignal Inc., discloses joining together carbon-carbon composite parts by means of a reactive-bonding joint interlayer. The interlayer is formed of fine particles of carbide-forming metallic ingredients and carbon. U.S. Pat. No. 5,972,157 teaches that the reactive-bonding layers are metal-rich non-stoichiometric mixture of meals and carbon. "The metals included in the compounds may include at least one element selected from the group consisting of W, Ti, Si, Ta, Nb, Zr, Hf, V, Cr, and Mo. . . . Tungsten is the preferred major metallic ingredient in the joint compound . . . . In some cases, short carbon fibers having an average length up to 5 mm in length are incorporated into the reactive-bonding layer to further reinforce the joint . . . . The reactive-bonding layer may also contain one or more refractory compounds as filler materials . . . . Representative of such refractory compounds are $TiB_2$, BN, $B_4C$, SiC, TiC, $MoSi_2$, $WSi_2$." Column 3, line 43—column 4, line 24. U.S. Pat. No. 5,972,157 discloses in Example 1 joining together two carbon-carbon composite parts with a bonding layer of a slurry made from 10 grams of tungsten powder and 0.5 grams of carbon powder and 12 milliliters of methanol. The joined parts with the bonding layer between them were heated in an argon atmosphere and under a compressive pressure of 5 megapascals to a temperature of 1450-1580° C. for a period of from 10-30 minutes.

In summary, the process of U.S. Pat. No. 5,972,157 requires several relatively complex steps, including: placing the pieces to be bonded into a non-oxidizing atmosphere; heating the pieces, under pressure, to the ignition point of carbon and titanium (that is, about 1600° C.); maintaining the pressure while the reaction occurs; and cooling the joined pieces to below the oxidation temperature of carbon-carbon while maintaining the non-oxidizing atmosphere.

SUMMARY OF THE INVENTION

In contrast, the present invention places the pieces and powders into a press and applies pressure, initiates combustion with an electrical current, and removes the part (joined pieces) from the press and puts the next part (pieces to be joined) into the press. Altogether, bonding pieces to form a part in accordance with the present invention can be done in 3 minutes or so, often in even less time. Thus the present invention provides for dramatically improved processing economically speaking.

One embodiment of this invention is a method of joining carbon-carbon composite pieces together. The method includes the steps of: providing a first carbon-carbon composite piece and a second carbon-carbon composite piece, wherein the second carbon-carbon composite piece has a surface that is complementary to a surface of the first carbon-carbon composite piece; providing a layer of a mixture of titanium powder and carbon powder on the first complementary mating surface; arranging the second carbon-carbon composite piece on the powder layer such that the second complementary mating surface is matched to the first complementary mating surface, thereby forming a construct of the first carbon-carbon composite piece, the powder layer, and the second carbon-carbon composite piece; placing the construct into a press and applying pressure to the construct to press together the two pieces joined at their complementary surfaces; and applying an electrical current to the powder in the construct to initiate an oxidation-reduction reaction, thereby bonding the carbon-carbon composite pieces together.

In a preferred embodiment of this invention, the carbon powder is powdered graphite and the mole ratio of titanium powder to powdered graphite ranges from 3:1 to 1:1 with a mole ratio of titanium powder to powdered graphite of 2:1 being especially preferred. The average diameter of the titanium powder particles used in this invention typically ranges from 25 to 250 microns, with particles about 45 microns in diameter being particularly preferred. The average diameter of the graphite particles used in this invention typically ranges from 1 to 10 microns, with particles about 2 microns in diameter being particularly preferred. The layer of titanium powder and carbon powder will typically range from 10 to 100 microns in thickness, with a layer of titanium powder and carbon powder about 30 microns in thickness being particularly preferred.

In accordance with this invention, the bonded composite pieces can be removed from the press within 30 minutes, even within 3 minutes, of placing the unbonded pieces into the press. The pressure that can be applied to press together the two pieces to be joined will typically range from 5000 $lbs/in^2$ to 10,000 $lbs/in^2$. A pressure of about 7400 $lbs/in^2$ has been found to be convenient. The electrical current that can be applied to the powder in the construct to initiate the oxidation-reduction reaction will typically range from 400 to 1200 Amps. An electrical current of about 600 Amps has been found to be convenient.

Another embodiment of the present invention is a carbon-carbon composite aircraft brake disc, produced by the method described herein. A preferred embodiment of this carbon-carbon composite brake disc is made of two disc-shaped pieces joined together by a layer, e.g. a layer 30 microns thick, formed from titanium and carbon powders.

BRIEF DESCRIPTION OF THE DRAWING

The present invention will be more fully understood by reference to the detailed description given hereinbelow and to the accompanying drawing. The drawing is not to scale, and is provided by way of illustration only. It does not in any way limit the present invention.

FIG. 1 is a perspective view of a portion of an aircraft brake stator refurbished in accordance with the present invention.

DETAILED DESCRIPTION OF THE INVENTION application Ser. No. 11/392,341, filed concurrently herewith, entitled 'APPARATUS AND METHOD FOR BONDING CARBON-CARBON COMPOSITES THROUGH A REACTANT LAYER' describes an apparatus and methods for bonding carbon-carbon composites through a reactant layer. The apparatus and methods described in Ser. No. 11/392,341 may be employed to practice the present invention. Accordingly, the entire disclosure of Ser. No. 11/392,341 is expressly incorporated by reference into this application.

The present invention employs liquid titanium carbide as a hot "glue". The melting point of titanium carbide is significantly higher than the operating temperatures of aircraft brakes. Also, the heat capacity of titanium carbide on a volume basis is comparable to that of carbon-carbon composites, so the bonding material does not degrade the thermal properties of the brakes.

In accordance with this invention, carbon-carbon composite pieces to be joined together are selected and machined to have a good fit. That is to say, a large surface area relative to the overall size of the pieces should be present complementarily on both pieces. The simplest example of complementary surfaces is two surfaces that are flat. However, irregularly shaped pieces, such as pieces having corresponding convexities and concavities, can be joined together by the method of the present invention. Two complementary surfaces are considered to be matched up when they are arranged such that there is a minimum amount of space between them.

A mixture of titanium powder and carbon powder is placed on one of the complementary mating surfaces. The particle size of the titanium and carbon powders should be small, in order to create a large powder surface area that will support a rapid combustion reaction. Generally, the average diameter of the titanium powder particles will range from 25 to 250 microns, and the carbon powder will powdered graphite in which the average diameter of the graphite particles will range from 1 to 10 microns. Typical specific examples would be titanium powder particles having an average diameter of about 45 microns, and graphite particles having an average diameter of about 2 microns. Such powders can be prepared as needed, but they are commercially available from a variety of sources, including Alfa Aesar (a Johnson Matthey Company) of Ward Hill, Mass. The titanium (Ti) and carbon (C) powders will generally be mixed in molar ratio of titanium powder to powdered graphite ranging from 3:1 to 1:1. We have found that a molar ratio of Ti to C of about 2:1 works well.

To effect bonding, the other complementary mating surface is placed onto the complementary mating surface to which the powder mixture has been applied, and the two pieces joined at their complementary surfaces with a layer of titanium and carbon powder between them are pressed tightly. A typical pressure would be on the order of 7400 pounds per square inch, applied for 10 seconds. While the construct is under pressure, an electrical current is applied to the construct in order to begin a combustion reaction. A typical electric current would be 600 Amps applied for 5 seconds. The oxidation-reduction reaction, once started, is highly exothermic, and has an adiabatic product temperature of over 3000° C. The product of the reaction is titanium carbide at a temperature so high that the TiC is in liquid form.

The powder mixture may be placed in the joint area by any convenient method. For instance, when an aircraft brake disc is being refurbished, the bottom piece will lie in a horizontal plane and the mixed powder can be shaken out onto the flat surface from a "salt shaker" type dispenser. Pressure on the carbon-carbon composite pieces forces small amounts of the liquified TiC into the pores of the composite pieces. The operator will normally distribute the powder mixture as evenly as possible. However, a precisely uniform layer of powder is not essential, because during the bonding procedure, the liquefied powder is distributed evenly across the joint plane and partially forced into pores of the composite materials being bonded together. The heat of the reaction is rapidly absorbed by the carbon-carbon composite, lowering the temperature of the reaction product. As the liquid reaction product material cools below 2500° C., the liquid "freezes", bonding the carbon-carbon composite pieces together.

FIG. 1 provides a perspective view of a portion of an aircraft brake stator 10. Stator 10 comprises layer 11 from an original aircraft brake stator. The original brake stator is originally approximately twice as thick as layer 11, but its top (friction) surface becomes worn in use. The original aircraft brake stator is therefore ground down across its entire top planar surface to approximately half its original thickness. Then a matching layer 19 is placed on top of the ground down top planar surface. Matching layer 19 can be a newly manufactured aircraft brake stator friction surface, or it can be another layer similar to layer 11 obtained by grinding down an original aircraft brake stator. Before matching layer 19 is placed on top of layer 11, a thin layer 15 of titanium and carbon powder mixture is placed on top of layer 11. After processing in accordance with the present invention, a refurbished aircraft brake stator 10 is produced.

EXAMPLE

Employing an apparatus as described in copending application Ser. No. 11/392,341, a controller is programmed with an initial loading force of 500 lbs/in$^2$, a maximum loading force of 7400 lbs/in$^2$, a delay time of maximum force application of 1 second, a time of maximum force application of 10 seconds, a maximum current of 600 Amps, a time of current of 5 seconds, and an initial temperature of 30° C. A worn brake disc friction surface portion is removed from a carbon-carbon composite aircraft brake disc, leaving a first flat disc-shaped piece approximately half the thickness of the original brake disc. Next, the area from which the worn portion was removed is covered with a thin layer that is a mixture of titanium carbide particles and carbon powder. Subsequently, a corresponding second flat disc-shaped piece of carbon-carbon composite material is placed on top of the layer of TiC/graphite mixture on the first disc-shaped piece, to form a "sandwich" construct having two "slices" of carbon-carbon composite material with a "filling" of titanium/graphite powder. The resulting construct is placed in the apparatus and the TiC/graphite mixture is ignited, bonding the new friction surface in place and providing a refurbished full size brake disc.

What is claimed is:

1. A method of joining carbon-carbon composite pieces together to form an aircraft brake disc, the method comprising:

providing a first carbon-carbon composite piece and a second carbon-carbon composite piece, wherein said second carbon-carbon composite piece has a surface that is complementary to a surface of said first carbon-carbon composite piece, and wherein said first and second carbon-carbon composite pieces together form an aircraft brake disc;

providing a layer of a mixture of titanium powder having an average particle diameter of from 25 to 250 microns and carbon powder on said first complementary mating surface;

arranging said second carbon-carbon composite piece on the powder layer such that said second complementary mating surface is matched to said first complementary mating surface, thereby forming a construct of said first carbon-carbon composite piece, said powder layer, and said second carbon-carbon composite piece;

placing the construct into a press and applying pressure to the construct to press together said two pieces joined at their complementary surfaces; and applying an electrical current of from 400 to 1200 Amps to the powder in said construct to initiate an oxidation-reduction reaction and produce an adiabatic temperature therein of over 3000° C., thereby bonding the carbon-carbon composite pieces together.

2. The method of claim 1, wherein the carbon powder is powdered graphite and the mole ratio of titanium powder to powdered graphite ranges from 3:1 to 1:1.

3. The method of claim 2, wherein the mole ratio of titanium powder to powdered graphite is 2:1.

4. The method of claim 1, wherein the average diameter of the titanium powder particles is about 45 microns.

5. The method of claim 1, wherein the carbon powder is powdered graphite and the average diameter of the graphite particles ranges from 1 to 10 microns.

6. The method of claim 5, wherein the average diameter of the graphite particles is about 2 microns.

7. The method of claim 1, wherein the layer of titanium powder and carbon powder ranges from 10 to 100 microns in thickness.

8. The method of claim 7, wherein the layer of titanium powder and carbon powder is about 30 microns in thickness.

9. The method of claim 1, wherein a pressure ranging from 5000 lbs/in$^2$ to 10,000 lbs/in$^2$ is applied to the construct.

10. The method of claim 9, wherein a pressure of about 7400 lbs/in$^2$ is applied to the construct.

11. The method of claim 1, wherein an electrical current of about 600 Amps is applied to the powder in the construct to initiate the oxidation-reduction reaction.

* * * * *